US008379026B2

(12) United States Patent
Stoll et al.

(10) Patent No.: US 8,379,026 B2
(45) Date of Patent: Feb. 19, 2013

(54) MULTIRESOLUTION RAY INTERSECTION

(75) Inventors: Gordon W. Stoll, San Carlos, CA (US); William R. Mark, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1595 days.

(21) Appl. No.: 11/648,058

(22) Filed: Dec. 29, 2006

(65) Prior Publication Data

US 2008/0159651 A1 Jul. 3, 2008

(51) Int. Cl.
*G06T 17/00* (2006.01)
(52) U.S. Cl. ...................................... 345/428
(58) Field of Classification Search .................. 345/428
See application file for complete search history.

(56) References Cited

U.S. PATENT DOCUMENTS 6,614,428 B1 * 9/2003 Lengyel ........................ 345/420
7,477,253 B2 * 1/2009 Kudoh et al. .................. 345/473

OTHER PUBLICATIONS

Hugues Hoppe, Progressive Meshes, International Conference on Computer Graphics and Interactive Techniques, Proceedings of the 23rd Annual Conference on Computer Graphics and Interactive Techniques, ACM, 1996, pp. 99-108.*
Homan Igehy, Tracing Ray Differentials, International Conference on Computer Graphics and Interactive Techniques, Proceedings of the 26th Annual Conference on Computer Graphics and Interactive Techniques, ACM, 1999, pp. 179-186.*
Christensen et al., "Ray Differentials and Multiresolution Geometry Caching for Distribution Ray Tracing in Complex Scenes", Eurographics 2003, vol. 22 (2003), No. 3. Blackwell Publishers, 108 Cowley Road, Oxford OX4 1JF UK.

* cited by examiner

*Primary Examiner* — Xiao M. Wu
*Assistant Examiner* — Charles Tseng
(74) *Attorney, Agent, or Firm* — Buckley, Maschoff & Talwalkar LLC

(57) ABSTRACT

According to some embodiments, systems, methods, apparatus, computer program code and means are provided to interpolate from a first portion of a digital object having a first level of detail to a second portion of the digital object having a second level of detail, create a third portion of the digital object having a third level of detail based on the interpolating, and intersect a ray at the third portion.

14 Claims, 5 Drawing Sheets

Interpolate from a first portion of a digital object having a first level of detail to a second portion of the digital object having a second level of detail
201

Create a third portion of the digital object having a third level of detail based on the interpolating; and
202

Intersect a ray at the third portion.
203

MULTIRESOLUTION RAY INTERSECTION

BACKGROUND

Ray tracing is a video rendering technique that produces photo-realistic images. In nature, a light source, such as the sun, emits rays of light that travel towards a surface of an object. In a perfect world these rays might be straight lines but in reality, these rays may either be absorbed, reflected, and/or refracted by the object or other nearby objects. For example, a surface of an object may reflect the ray in a plurality of directions. If the ray is absorbed, the ray may lose intensity and if the surface has transparent or translucent properties, the ray may be refracted.

In a computer application, the above mentioned absorbed, reflected and refracted rays may be utilized to create a digital image of a digital object and/or nearby digital objects. However, as a digital object is viewed and a perspective becomes closer to the object, more detail related to the digital object may be required and accordingly, as the digital object is viewed from a further perspective less detail may be needed.

BRIEF DESCRIPTION OF THE DRAWINGS

FIG. 2 is a block diagram of a process according to some embodiments.

DETAILED DESCRIPTION

The several embodiments described herein are provided solely for the purpose of illustration. Embodiments may include any currently or hereafter-known versions of the elements described herein. Therefore, persons in the art will recognize from this description that other embodiments may be practiced with various modifications and alterations.

Digital objects or digital geometries may be described at various discrete levels of detail. For example, a perfect sphere at a first level of detail may look like a sphere but at a lower resolution it may look sphere-ish (e.g. diamond facets approximating a spherical outline), and finally, at a lowest level of detail, the sphere might look like a cube. If a ray is projected towards the sphere at the lowest level of detail (e.g. looking like a cube), it may be possible that a viewer might conclude incorrectly that the ray will miss the sphere, whereas at a finer level of detail representation the viewer might correctly determine that the sphere was hit by the ray.

As a viewer's perspective gets closer to a digital object (e.g. zooms in) different versions of the digital object may be displayed. For example, version 1 of a digital object may have the lowest level of detail, version 2 may have an intermediate level of detail and version 3 may have the finest or highest level of detail. However, any number of versions of an object may be displayed.

Using the aforementioned example, when viewing the digital object from a distance, version one may be displayed. As the viewer's perspective gets closer to the digital object, version 2 may be displayed. Finally, as the viewer's perspective gets even closer to the digital object, version 3 may be displayed. Unfortunately, in a ray tracer, when displaying objects having discrete levels of detail, a video image may suffer from what is known in the art as "the tunneling problem". The tunneling problem may be described as an occurrence when a ray, or an application associated with the ray, that requires a series of a digital object having a plurality of discrete levels of detail, passes through a surface of the digital object without the intersection being detected due to an abrupt transition from one version having a first discrete level of detail to another version having a second discrete level of detail at a point along the ray. The result of the abrupt transition may be a creation of a crack or a hole in the digital object or image.

Figure 1:
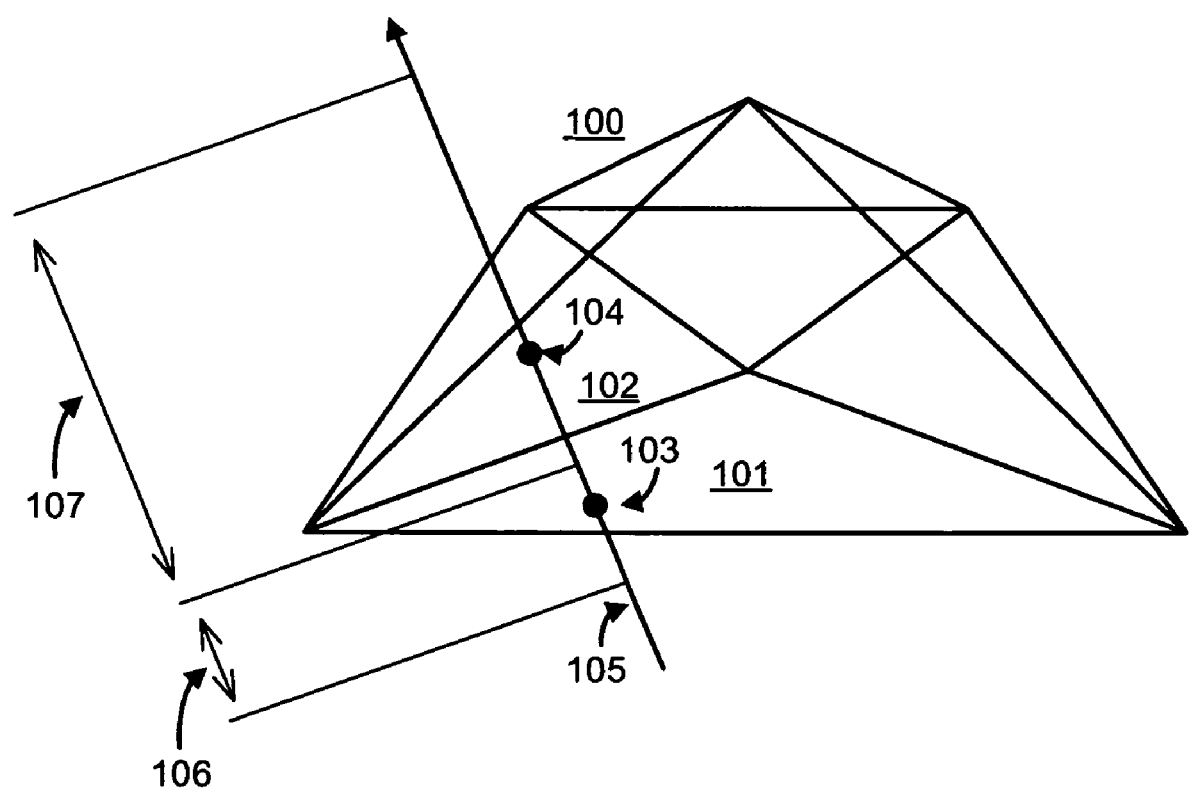
FIG. 1 illustrates a digital object according to some embodiments.

Now referring to FIG. 1, an embodiment of a digital object 100 is shown. The digital object 100 may be composed of a plurality of portions each having a discrete level of detail. Each of the plurality of portions may comprise a plurality of triangles where a level of detail may be defined by a number of triangles per unit of area. However, in some embodiments, other geometric shapes, such as, but not limited to a square or rectangle may be used. For example a first portion 101 of the digital object 100 may have a first level of detail comprising a first number of triangles per unit of area and a second portion 102 of the digital object may have a second level of detail comprising a second number of triangles per unit of area. In some embodiments, the first level of detail may comprise more triangles per unit of area than the second level of detail and accordingly, the first portion may have a finer level of detail than the second level of detail.

From a perspective of a person looking at the digital object 100, a ray 105 may intersect a surface of the digital object at a first point 103 and intersect the surface of the digital object 100 at a second point 104. Since the first portion 101 and the second portion 102 may have different discrete levels of detail, the ray 105 may miss the surface of the digital object 100 completely if a requested level of detail were to change at a point along the ray 105 where the point of change is between the surfaces produced by two discrete levels of details.

For example, the ray 105 may have a first length 106 and a second length 107. In some embodiments, first length 106 may be associated with a requested first level of detail and the second length 107 may be associated with a requested second level of detail. If the level of detail that a ray, or an application associated with the ray, requests should change, as shown in the illustrated example when changing from first length 106 to second length 107, then the ray 105 may miss the surface of the digital object 100.

Now referring to FIG. 2, a process 200 is illustrated. The process 200 may be executed by any combination of hardware, software, and firmware such as, but not limited to the system of FIG. 5 as will be discussed later. Some embodiments of the method 200 may facilitate ray tracing using multiple versions of an object where each version may have a discrete level of detail. At 201, an interpolation from a first portion of a digital object having a first level of detail to a second portion of the digital object having a second level of detail is performed. In some embodiments, interpolating between adjacent discrete levels of detail may produce a unique continuous surface for each intersection of each ray to avoid the tunneling problem.

Each triangle in the first portion 101 may correspond to one or more parts of one or more triangles in the second portion. For example, the first portion may comprise a fine mesh and the second portion may comprise a coarse mesh and each vertex of a triangle in the fine mesh may correspond with a point on a corresponding triangle in the coarse mesh having similar latitude/longitude or (x, y, z) space coordinates. In some embodiments, the point on the corresponding triangle may not be a vertex and the point may lie inside the corresponding triangle.

Next, at 202, a third portion of the digital object having a third level of detail based on the interpolating is created. The third portion may comprise a third level of detail. In some embodiments the third level of detail may be between the first level of detail and the second level of detail. For example, in some embodiments, the third level of detail may be finer than the first level of detail but coarser than the second level of detail, and in some embodiments, the third level of detail may be coarser than the first level of detail but finer than the second level of detail.

In some embodiments, interpolating may be performed independently for each vertex in the first portion (e.g. a separate interpolation weight may be used for each of the three vertices of a triangle). For example, the interpolation weight associated with each vertex in an area having a fine mesh may be determined by projecting the vertex onto a ray, and computing the weight from a continuous scale function defined with respect to the ray. The interpolation weight associated with each vertex of a triangle may be based on a desired level of detail for a point along the ray.

For example, if a plurality of discrete representations of a single object each comprise a different level of detail (e.g. version 3, and version 4) then each discrete representation may define a surface comprising a plurality of triangles where a finer representation has more triangles per unit area than a coarser representation.

A "desired" level may a level of detail requested by a ray and may be, for example, between a first version and a second version. For example, if a first version is version 3 and a second version is version 4 then a desired level may be a version 3.2713. If version 3 is a finer representation and version 4 is a coarser representation then a single vertex ("F") from the "finer" version 3 may correspond or map to some point "C" on the "coarser" version 4. For example if version 3 and version 4 each represent a sphere at different levels of detail, then F and C may both correspond to the same latitude/longitude coordinates on the sphere. In some embodiments, while F is a vertex of a triangle C may lie inside some triangle in version 4.

F may be projected perpendicularly onto a ray, and may partially determine the "desired" level of detail at that point. If for example, the desired level of detail is 3.1 (e.g. 1/10th of the way between version 3 and version 4) then the interpolation weight may be based on the fractional part (the 1/10th), indicated as "S". Accordingly, the formula for the interpolated point is: F+S*(C−F). In the aforementioned example, the formula results in a weight for the single vertex F comprising a 90% "F" and a 10% "C" mix. In some embodiments, geometric space coordinates are calculated for the third portion based on the projection of the first vertex, the projection of the second vertex, and the projection of the third vertex.

In some embodiments, a distance from the origin of the ray to the vertex, rather than a projection of the vertex onto the ray, might be desired when multiple rays share an origin (e.g. such as within a SIMD packet). If in a case comprising a plurality of rays with a common origin, weighting may be based on a distance from the common origin rather than projection of the vertex onto the ray. This may result in a single interpolated surface for the plurality of rays.

At 203, a ray may intersect at the third portion. In some embodiments, a single intersect calculation may be determined based on the third portion. In general, if the "fine" mesh and the "coarse" mesh are both well-constructed surfaces with no holes in them (e.g. "watertight" or "crack free"), then the interpolated surface that is intersected may also be watertight.

Figure 3:
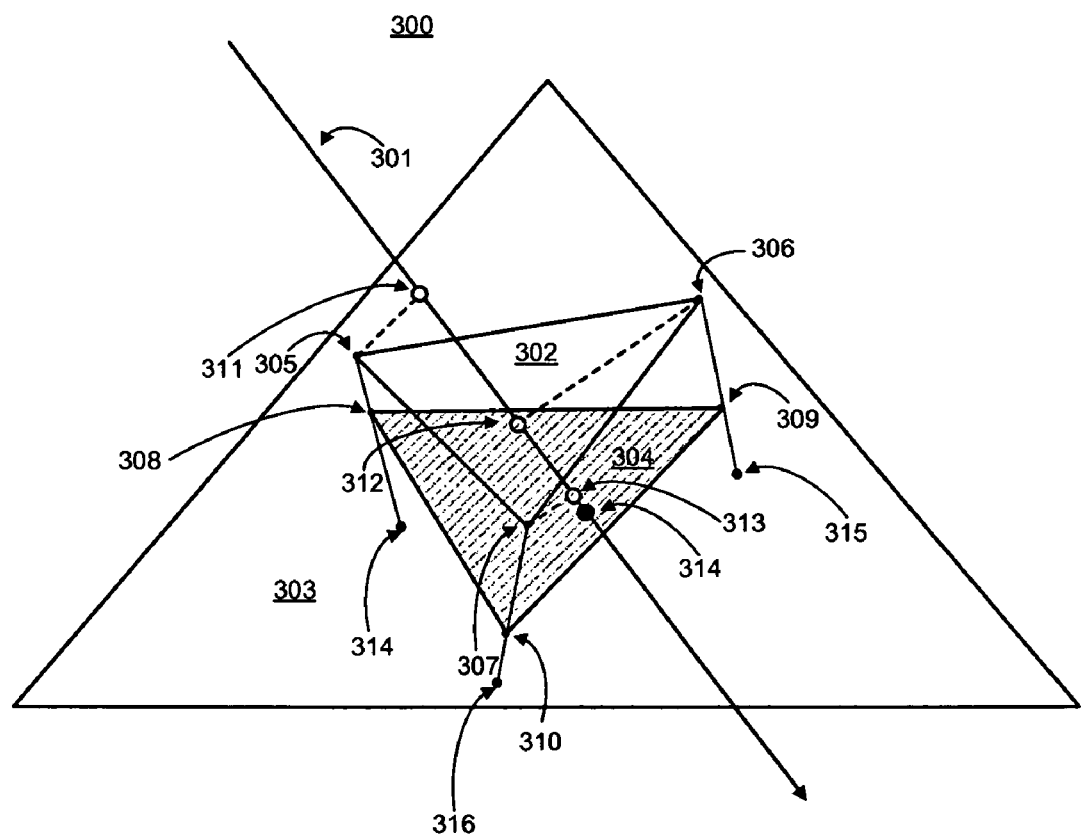
FIG. 3 illustrates a digital object according to some embodiments.

Now referring to FIG. 3, a digital object 300 is shown according to some embodiments. In some embodiments, FIG. 3 may illustrate interpolating between a single triangle comprising a fine level of detail and a single triangle comprising s coarse level of detail. The digital object 300 may comprise a first triangle 302 and a second triangle 303. In some embodiments, the first triangle 302 may comprise a first level of detail and the second triangle 303 may comprise a second level of detail. The first triangle may have a first vertex 305, a second vertex 306, and a third vertex 307. Each vertex 305/306/307 of the first triangle 302 may correspond to a point on the second triangle 312. For example, and as illustrated in FIG. 3, vertex 305 may correspond to point 314 located on a surface of second triangle 303. Similarly, vertex 306 may correspond to point 315 on the surface of second triangle 303, and vertex 307 may correspond to point 316 on the surface of second triangle 303. Using conventional methods, switching from the first triangle 302 to the second triangle 303 may occur when the each vertex 305/306/307 is transitioned to its respective point 314/315/316 on the second triangle 303.

However, by interpolating between the first triangle 302 and the second triangle 303, a plurality of interpolated triangles may lay between the first triangle 302 and the second triangle 303. An example of an interpolated triangle is illustrated as a third triangle 304 that may be created to facilitate a continuous transition between the first triangle 302 and the second triangle 303.

In some embodiments, to interpolate between the first triangle 302 and the second triangle 303, the vertices of the first triangle 302 may be projected onto the ray 301.

For example, vertices 305, 306, and 307 may be projected onto the ray 301 and their respective projected points may be 311, 312, and 313. In some embodiments, a projected point on a ray may be the intersection of a vector that is normal to the ray and intersects a respective vertex.

By entering the coordinates for points 311, 312, and 313 into a continuous scale function, an interpolation weight for each vertex may be computed. The third triangle 304, having vertices 308, 309, and 310 may be determined by the interpolation weighting for each vertex between the first triangle 302 and the second triangle 303. As shown in the illustrated embodiments, a ray 301 may intersect the third triangle at new intersection point 314.

Figure 4:
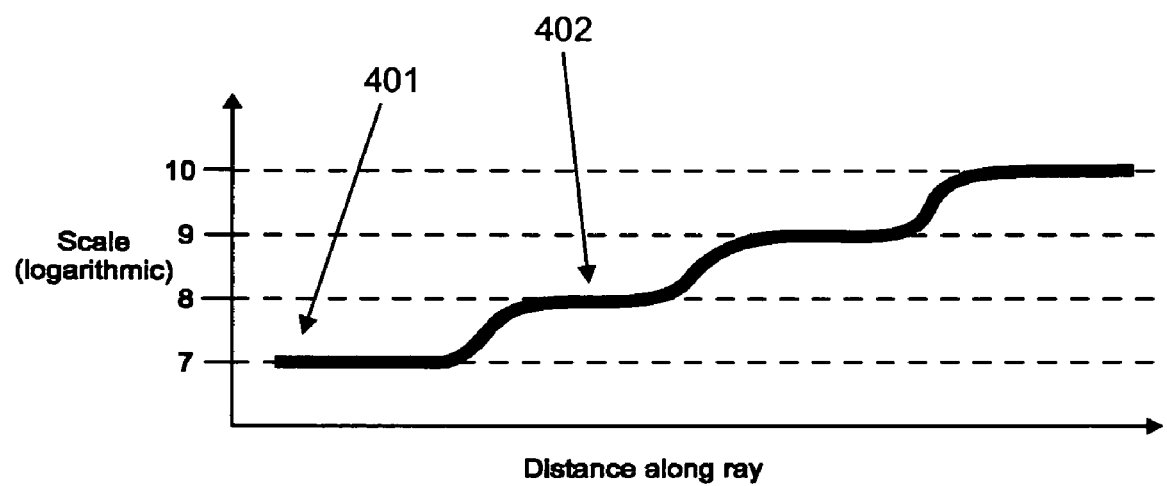
FIG. 4 illustrates a scale function according to some embodiments.

Now referring to FIG. 4, an embodiment of a scale function is illustrated. In some embodiments, the scale function may be a smooth step function as known in the art. As described above, the scale function may determine an interpolation for each vertex weight associated with an intersection of a ray at a digital object comprising different discrete levels of detail. The continuous scale function may be calculated using ray differentials (e.g. the difference between rays). In some embodiments, the scale function may be adjusted so that a switch from using one pair of levels (e.g. a first version having a first level of detail and an interpolated version) to using another pair of levels occurs in a region of flat scale or constant-scale. Constant-scale regions may be large enough so that any individual vertex may always be "seen" consistently by the ray.

Figure 5:
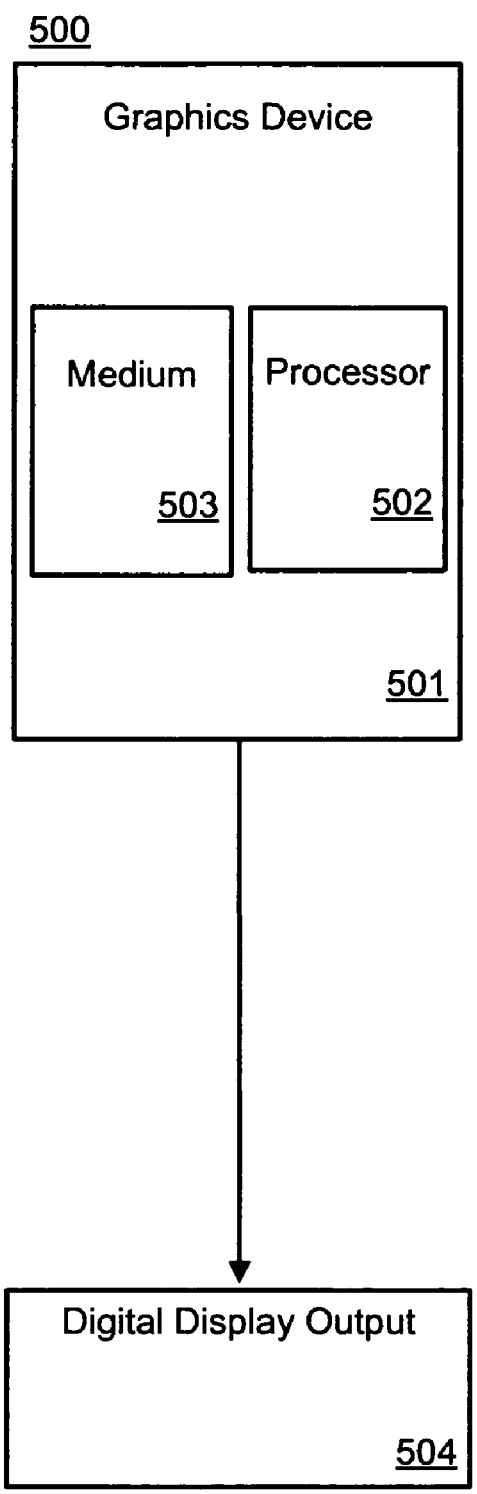
FIG. 5 is a block diagram of a system according to some embodiments.

As illustrated in FIG. 4, a system, such as, but not limited to, as described with respect to FIG. 5, may manipulate scale values along the ray to insure that regions of constant-scale separate regions of varying-scale from each other. In some embodiments, the regions of constant-scale correspond to one of the discrete levels of detail. For example, a first version of a digital object may have a scale value of 7 that corresponds to a first area of constant-value 401, and a second version of a digital object may have a scale value of 8 that corresponds to a second area of constant-value 402. Thus, the interpolation from the first version to a second version may occur prior to switching from scale 7 to scale 8 which may be located in the first area of constant value.

The process 200 may interpolate a ray with an interpolated portion of a digital object that has a desired level of detail anywhere between two neighboring discrete levels. Levels associated with a ray may be divided into sections, (e.g. (1 to 2), (2 to 3), (3 to 4), etc.), and each section may be intersected with on or more interpolated versions of the object between the two discrete levels.

For example, at a location on the ray that is requesting exactly version 3.0, there may be an abrupt transition from using a (2 to 3) interpolation to using a (3 to 4) interpolation. Rather than using the value S as described previously, a mathematical function may be applied to S to slow the rate of our interpolation to zero near these abrupt transition points. This may result in flat regions in the scale function graph as illustrated in FIG. 4, which in some embodiments may reduce the creation of artifacts.

Now referring to FIG. 5, an embodiment of a system 500 is illustrated. The system 500 may comprise a graphics device 501, and a digital display output 504 to output a digital signal from the graphics device.

In some embodiments, the graphics device 501 may comprise, but is not limited to, a computer, a desktop, a notebook, or a personal data assistant. The graphics device may comprise a medium 503 and a processor 502. The medium 503 may store instructions that when executed by the processor 502 perform a method, such as, but not limited to, the process described with respect to FIG. 2.

The medium 503 may comprise any magnetic media, read only memory, random access memory, flash memory, non-volatile memory, or any other available medium that may store instructions adapted to be executed by the processor 502.

The processor 502 may comprise any integrated circuit that is or becomes known. For purposes of the present description, the processor 502 may comprise a system for executing program code. The program code may comprise one or more threads of one or more software applications. The processor 502 may include or otherwise be associated with dedicated registers, stacks, queues, etc. that are used to execute program code and/or one or more of these elements may be shared there between.

The foregoing disclosure has been described with reference to specific embodiments thereof. It will, however, be evident that various modifications and changes may be made thereto without departing from the broader spirit and scope set forth in the appended claims.

What is claimed is:

1. A method comprising:
   interpolating, using a processor, from a first portion of a digital object having a first level of detail to a second portion of the digital object having a second level of detail, wherein the first portion comprises one or more triangles and the second portion comprises one or more triangles;
   creating a third portion of the digital object having a third level of detail based on the interpolating, wherein the third portion comprises one or more triangles; and
   intersecting a ray at the third portion, wherein the interpolating comprises:
   projecting a first vertex of one of the one or more triangles of the first portion onto a ray to create a first projected point;
   projecting a second vertex of one of the one or more triangles of the first portion onto the ray to create a second projected point;
   projecting a third vertex of one of the one or more triangles of the first portion onto the ray to create a third projected point; and
   calculating a geometric space coordinate from the projection of the first vertex, the projection of the second vertex, and the projection of the third vertex, and
   wherein each projected point on the ray is the intersection of a vector that is normal to the ray and intersects each respective vertex.

2. The method of claim 1, wherein the first portion comprises a greater number of triangles per area than the second portion.

3. The method of claim 1, wherein the first level of detail is finer than the second level of detail.

4. The method of claim 1, wherein the third level of detail is coarser than the first level of detail and finer than the second level of detail.

5. The method of claim 1, wherein the interpolating is computed from a continuous scale function along the ray.

6. An apparatus comprising:
   a processor;
   a medium storing instructions that when executed by the processor perform a method, the method comprising:
   interpolating from a first portion of a digital object having a first level of detail to a second portion of the digital object having a second level of detail, wherein the first portion comprises one or more triangles and the second portion comprises one or more triangles;
   creating a third portion of the digital object having a third level of detail based on the interpolating, wherein the third portion comprises one or more triangles; and
   intersecting a ray at the third portion, wherein the interpolating comprises:
   projecting a first vertex of one of the one or more triangles of the first portion onto a ray to create a first projected point;
   projecting a second vertex of one of the one or more triangles of the first portion onto the ray to create a second projected point;
   projecting a third vertex of one of the one or more triangles of the first portion onto the ray to create a third projected point; and
   calculating a geometric space coordinate from the projection of the first vertex, the projection of the second vertex, and the projection of the third vertex, and
   wherein each projected point on the ray is the intersection of a vector that is normal to the ray and intersects each respective vertex.

7. The apparatus of claim 6, wherein the first portion comprises a greater number of triangles per area than the second portion.

8. The apparatus of claim 6, wherein the first level of detail is finer than the second level of detail.

9. The apparatus of claim 6, wherein the third level of detail is coarser than the first level of detail and finer than the second level of detail.

10. The apparatus of claim 6, wherein the interpolating is computed from a continuous scale function along the ray.

11. A system comprising:
    a digital display output, to output a digital signal;
    a processor;

a medium storing instructions that when executed by the processor perform a function, the function comprising:

interpolating from a first portion of a digital object having a first level of detail to a second portion of the digital object having a second level of detail, wherein the first portion comprises one or more triangles and the second portion comprises one or more triangles;

creating a third portion of the digital object having a third level of detail based on the interpolating, wherein the third portion comprises one or more triangles; and intersecting a ray at the third portion, wherein the interpolating comprises:

projecting a first vertex of one of the one or more triangles of the first portion onto a ray to create a first projected point;

projecting a second vertex of one of the one or more triangles of the first portion onto the ray to create a second projected point;

projecting a third vertex of one of the one or more triangles of the first portion onto the ray to create a third projected point; and calculating a geometric space coordinate from the projection of the first vertex, the projection of the second vertex, and the projection of the third vertex, and wherein each projected point on the ray is the intersection of a vector that is normal to the ray and intersects each respective vertex.

12. The system of claim 11, wherein the first portion comprises a greater number of triangles per area than the second portion.

13. The system of claim 11, wherein the first level of detail is finer than the second level of detail.

14. The system of claim 11, wherein the third level of detail is coarser than the first level of detail and finer than the second level of detail.

* * * * *